(12) United States Patent
Kim

(10) Patent No.: US 8,544,263 B2
(45) Date of Patent: Oct. 1, 2013

(54) CONSTRUCTION EQUIPMENT HAVING ELECTRIC CONTROL LEVER

(75) Inventor: Dong Soo Kim, Jinhae-si (KR)

(73) Assignee: Volvo Construction Equipment Holding Sweden AB, Eskilstuna (SE)

( * ) Notice: Subject to any disclaimer, the term of this patent is extended or adjusted under 35 U.S.C. 154(b) by 776 days.

(21) Appl. No.: 12/795,038

(22) Filed: Jun. 7, 2010

(65) Prior Publication Data
US 2010/0313556 A1    Dec. 16, 2010

(30) Foreign Application Priority Data
Jun. 15, 2009  (KR) .................... 10-2009-0052903

(51) Int. Cl.
*F16D 31/02* (2006.01)
*F15B 13/044* (2006.01)

(52) U.S. Cl.
USPC ................................ 60/403; 60/459; 91/459

(58) Field of Classification Search
USPC ................ 60/327, 404, 403, 406, 459, 463, 60/328, 399
See application file for complete search history.

(56) References Cited

U.S. PATENT DOCUMENTS

| | | | | |
|---|---|---|---|---|
| 4,412,670 A | * | 11/1983 | Card et al. | 251/14 |
| 7,500,535 B2 | * | 3/2009 | Kamon et al. | 180/272 |
| 2012/0260642 A1 | * | 10/2012 | Opdenbosch et al. | 60/327 |

* cited by examiner

*Primary Examiner* — Edward Look
*Assistant Examiner* — Logan Kraft
(74) *Attorney, Agent, or Firm* — Ladas & Parry LLP

(57) ABSTRACT

Construction equipment having an electric control lever is provided, which can intercept a control signal applied to a flow control valve when trouble occurs in the electric control lever or a control unit. The construction equipment includes an electric control lever outputting a manipulation signal in proportion to a manipulation amount, a manipulation locking lever outputting a manipulation signal for control in preference to the manipulation signal when an error occurs in the manipulation signal, an electronic flow control valve installed in a flow path between the hydraulic pump and the hydraulic actuator and shifted, by signal pressure input in proportion to the manipulation signal, to control a start, a stop, and a direction change of the hydraulic actuator, a control unit having an operation unit operating a control signal that corresponds to the manipulation signal, and a current driving unit controlling current so that a current value corresponding to the control signal can be applied to the electronic flow control valve, and a power control unit intercepting current applied from the current driving unit to the electronic flow control valve when the manipulation locking lever is manipulated in a state where trouble has occurred in the electric control lever or the control unit.

9 Claims, 4 Drawing Sheets

CONSTRUCTION EQUIPMENT HAVING ELECTRIC CONTROL LEVER

CROSS-REFERENCE TO RELATED APPLICATION

This application is based on and claims priority from Korean Patent Application No. 10-2009-52903, filed on Jun. 15, 2009 in the Korean Intellectual Property Office, the disclosure of which is incorporated herein in its entirety by reference.

BACKGROUND OF THE INVENTION

1. Field of the Invention

The present invention relates to construction equipment which drives a working device such as a boom or the like in accordance with a manipulation of an electric control lever, and more particularly, to construction equipment having an electric control lever, which can intercept a control signal that is applied to a flow control valve when trouble occurs in the electric control lever or a control unit (ECU).

2. Description of the Prior Art

As illustrated in FIG. 1, construction equipment having an electric control lever in the related art includes an engine 50; a variable-displacement hydraulic pump (hereinafter referred to as a "hydraulic pump") 51 and a pilot pump 52 which are driven by the engine 50; a hydraulic actuator 53 such as a hydraulic cylinder or the like which is operated by the hydraulic pump 51; an electronic flow control valve (hereinafter referred to as a "flow control valve") (MCV) 54 installed in a flow path between the hydraulic pump 51 and the hydraulic actuator 53 to be shifted to control a start, a stop, and a direction change of the hydraulic actuator 53; an electronic control lever (hereinafter referred to as a "control lever") 56 outputting a manipulation signal in proportion to a manipulation amount; electro-proportional valves 57 and 58 converting hydraulic fluid from the pilot pump 52 into a secondary signal pressure in accordance with a current value applied from the control unit (ECU) 55 in proportion to the manipulation signal of the control lever 56, and shifting a spool of the flow control valve 54 in accordance with the converted signal pressure; a manipulation locking lever (hereinafter referred to as a "locking lever") 59 outputting a manipulation signal for control in preference to the manipulation signal of the control lever 56 when an error occurs in the manipulation signal of the control lever 56; and a solenoid valve 60 installed in a discharge flow path of the pilot pump 52 and shifted when the locking lever 59 is manipulated to intercept the signal pressure applied from the pilot pump 52 to the electro-proportional valves 57 and 58.

If the manipulation signal is input from the control lever 56 to the control unit 55 and the locking lever 59 is released from a locking position, the manipulation signal of the control lever 56 is calculated by a predefined algorithm, and is input to the electro-proportional valves 57 and 58 as a control signal.

By contrast, if the manipulation signal is input from the control lever 56 to the control unit 55 and the locking lever 56 is shifted to a locking position, the manipulation signal from the control lever 56 is disregarded even if the manipulation signal is input to the control unit 55.

At the same time, the discharge flow path of the pilot pump 52 can be opened or closed by a switch 61 installed on the locking lever 59. That is, if the locking lever 59 is shifted to a locking position, the solenoid valve 60 is kept in a closed state (e.g. a state as illustrated in FIG. 1), and thus hydraulic fluid supplied from the pilot pump 52 to the electro-proportional valves 57 and 58 can be intercepted.

On the other hand, in a hydraulic system using self pilot operated electro-hydraulic proportional values as illustrated in FIG. 5, the opening and closing of the electro-hydraulic proportional valves P1 to P4 and P5 to P8 is controlled by hydraulic fluid of hydraulic actuators 4 and 4b in accordance with a manipulation signal from a control lever 7. Accordingly, malfunction of working devices such as a boom or the like due to an erroneous manipulation signal of the control lever 7 or an error of the control unit cannot be cleared up.

In a hydraulic system having an electric control lever, electronic hydraulic control valves driven by the manipulation of the electric control lever, and the like, which is disclosed in U.S. Pat. No. 4,881,450, a sensor switch that can sense the non-manipulation state (i.e. neutral state) of the control lever is installed in order to prevent the malfunction of a working device. That is, when the control lever is in a neutral state, a drive signal from a controller to the hydraulic control valves is cut off.

In the hydraulic system of U.S. Pat. No. 4,881,450 as described above, in the case of operating a preferable control signal of the electronic proportional valves against the manipulation signal of the electric control lever, conversion logic according to a control signal delay, filtering, or forward/reverse conversion is frequently used for smooth acceleration/reduction or direction change of the working device. In this case, the driving current of the electronic proportional valves is voluntarily short-circuited by the sensor switch installed on the control lever, and thus it is difficult to apply a control signal that is processed by software thereto.

SUMMARY OF THE INVENTION

Accordingly, the present invention has been made to solve the above-mentioned problems occurring in the prior art while advantages achieved by the prior art are maintained intact.

Embodiments of the present invention are related to construction equipment having an electric control lever, which can intercept a control signal that is applied to a flow control valve when trouble occurs in the electric control lever or a control unit.

In a first embodiment of the present invention, there is provided construction equipment including an engine, a hydraulic pump and a pilot pump which are driven by the engine, and a hydraulic actuator which is operated by the hydraulic pump, which includes an electric control lever outputting a manipulation signal in proportion to a manipulation amount; a manipulation locking lever outputting a manipulation signal for control in preference to the manipulation signal of the electric control lever when an error occurs in the manipulation signal of the electric control lever; an electronic flow control valve installed in a flow path between the hydraulic pump and the hydraulic actuator and shifted, by signal pressure that is input in proportion to the manipulation signal of the electric control lever, to control a start, a stop, and a direction change of the hydraulic actuator; a control unit having an operation unit operating and outputting a control signal that corresponds to the manipulation signal of the electric control lever, and a current driving unit controlling current so that a current value corresponding to the control signal operated by the operation unit can be applied to the electronic flow control valve; and a power control unit intercepting current that is applied from the current driving unit to the electronic flow control valve when the manipulation locking lever is manipulated in a state where trouble has occurred in the electric control lever or the control unit.

In a third embodiment of the present invention, there is provided construction equipment including an engine, a hydraulic pump and a pilot pump which are driven by the engine, and a hydraulic actuator which is operated by the hydraulic pump, which includes an electric control lever outputting a manipulation signal in proportion to a manipulation amount; a manipulation locking lever outputting a manipulation signal for control in preference to the manipulation signal of the electric control lever when an error occurs in the manipulation signal of the electric control lever; an electronic flow control valve installed in a flow path between the hydraulic pump and the hydraulic actuator and shifted, by signal pressure that is input in proportion to the manipulation signal of the electric control lever, to control a start, a stop, and a direction change of the hydraulic actuator; a solenoid valve installed in a discharge flow path of the pilot pump and shifted in accordance with an electric signal input from the outside to intercept the signal pressure that is supplied to shift the electronic flow control valve; a control unit having an operation unit operating and outputting a control signal that corresponds to the manipulation signal of the electric control lever, and a current driving unit controlling current so that a current value corresponding to the control signal operated by the operation unit can be applied to the electronic flow control valve; and a power control unit intercepting current that is applied from the current driving unit to the electronic flow control valve when the manipulation locking lever is manipulated in a state where trouble has occurred in the electric control lever or the control unit.

In a fourth embodiment of the present invention, there is provided construction equipment including an engine, a hydraulic pump which are driven by the engine, and hydraulic actuators which are operated by the hydraulic pump, which includes an electric control lever outputting a manipulation signal in proportion to a manipulation amount; a manipulation locking lever outputting a manipulation signal for control in preference to the manipulation signal of the electric control lever when an error occurs in the manipulation signal of the electric control lever; electro-hydraulic proportional valves installed in a flow path between the hydraulic pump and the hydraulic actuators and shifted, by pressure that is formed in a supply-side flow path to which hydraulic fluid from the hydraulic pump is supplied in proportion to the manipulation signal of the electric control lever, to control a start, a stop, and a direction change of the hydraulic actuators; a control unit having an operation unit operating and outputting a control signal that corresponds to the manipulation signal of the electric control lever, and a current driving unit controlling current so that a current value corresponding to the control signal operated by the operation unit can be applied to the electro-hydraulic proportional valves; and a power control unit intercepting current that is applied from the current driving unit to the electro-hydraulic proportional valves when the manipulation locking lever is manipulated in a state where trouble has occurred in the electric control lever or the control unit.

In a preferred embodiment of the present invention, the power control unit includes a switch installed on the electric control lever, and when the electric control lever is manipulated, the switch is switched on to supply the power to the current driving unit.

In a preferred embodiment of the present invention, the power control unit includes a relay that is driven to supply the power to the current driving unit when the switch is switched on.

In a preferred embodiment of the present invention, the power control unit includes a relay which is connected to the current driving unit and is driven by the operation unit in accordance with an output signal of the manipulation locking lever to supply the power to the current driving unit.

In a preferred embodiment of the present invention, the operation unit and the manipulation locking lever are connected in a wired or wireless communication method to transfer the manipulation signal of the manipulation locking lever.

The construction equipment having the electric control lever as constructed above according to the embodiments of the present invention has the following advantages.

When an error occurs in the manipulation signal of the control lever or trouble occurs in the control unit, the power of the current driving unit that is applied to drive the flow control valve is intercepted, and thus the malfunction of a working device such as a boom can be prevented.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Hereinafter, preferred embodiments of the present invention will be described with reference to the accompanying drawings. The matters defined in the description, such as the detailed construction and elements, are nothing but specific details provided to assist those of ordinary skill in the art in a comprehensive understanding of the invention, and thus the present invention is not limited thereto.

Figure 2:
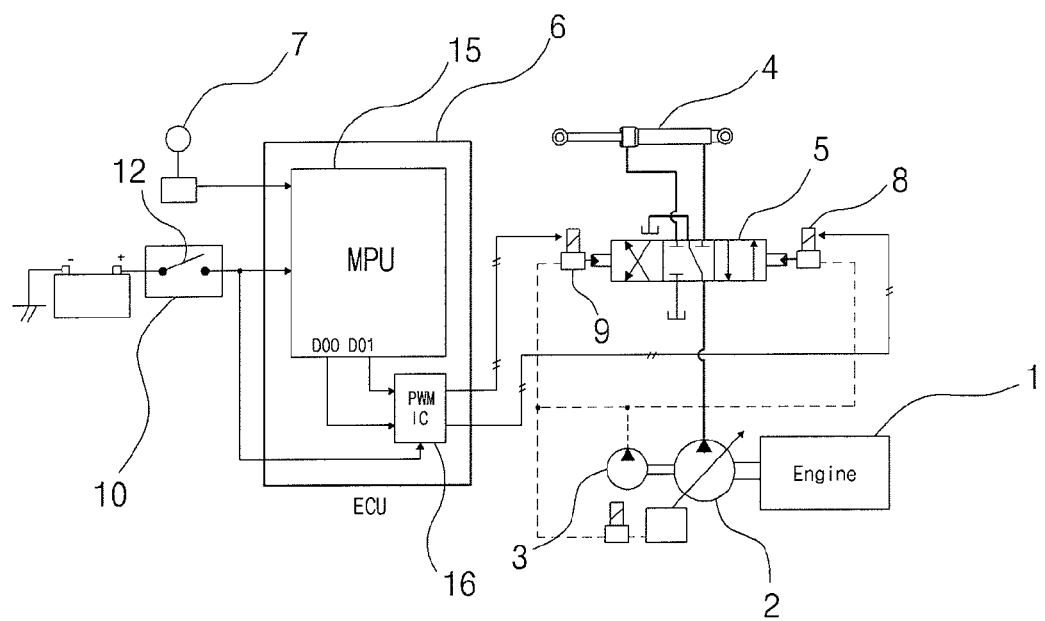
FIG. 2 is a hydraulic circuit diagram of construction equipment having an electric control lever according to a first embodiment of the present invention.

As illustrated in FIG. 2, construction equipment according to a first embodiment of the present invention, which includes an engine 1, a variable-displacement hydraulic pump (hereinafter referred to as a "hydraulic pump") 2 and a pilot pump 3 which are driven by the engine 1, and a hydraulic actuator 4 such as a hydraulic cylinder which is operated by the hydraulic pump 2, also includes an electric control lever (hereinafter referred to as a "control lever") outputting a manipulation signal in proportion to a manipulation amount; a manipulation locking lever (hereinafter referred to as a "locking lever") 10 outputting a manipulation signal for control in preference to the manipulation signal of the control lever 7 when an error occurs in the manipulation signal of the control lever 7; an electronic flow control valve (hereinafter referred to as a "flow control valve") 5 installed in a flow path between the hydraulic pump 2 and the hydraulic actuator 4 and shifted, by signal pressure that is input in proportion to the manipulation signal of the control lever 7, to control a start, a stop, and a direction change of the hydraulic actuator 4; a control unit (ECU) 6 having an operation unit (MPU) 15 operating and outputting a control signal that corresponds to the manipulation signal of the control lever 7, and a current driving unit 16 controlling current so that a current value corresponding to the control signal operated by the operation unit 15 can be applied to the flow control valve 5; and a power control unit intercepting current that is applied from the current driving unit 16 to the flow control valve 5 when the locking lever 10 is manipulated in a state where trouble has occurred in the control lever 7 or the control unit 6.

The power control unit includes a switch 12 installed on the locking lever 10, and when the locking lever 10 is manipulated, the switch 12 is switched on to supply the power to the current driving unit 16.

The power control unit includes a relay 18 that is driven to supply the power to the current driving unit 16 when the switch 12 is switched on.

The power control unit includes a relay 18 which is connected to the current driving unit 16 and is driven by the operation unit 15 in accordance with an output signal of the locking lever 10 to supply the power to the current driving unit 16.

The operation unit 15 and the locking lever 10 are connected in a wired or wireless communication method to transfer the manipulation signal of the locking lever 10.

Hereinafter, a use example of construction equipment having an electric control lever according to a first embodiment of the present invention will be described with reference to the accompanying drawings.

As illustrated in FIG. 2, the manipulation signal obtained through the manipulation of the control lever 7 and the manipulation signal obtained through the manipulation of the locking lever 10 are input to the operation unit (MPU) 15 of the control unit (ECU) 6. In this case, if the manipulation signal of the locking lever 10 is in an off state that corresponds to the locking position, the operation unit 15, regardless of the manipulation signal of the control lever 7, operates a current value in a standby state where a spool of the flow control valve 5 is not moved or the minimum current value, and outputs the corresponding current to electro-proportional valves 8 and 9.

In this case, since the current driving of the electro-proportional valves is performed mainly using a PWM (Pulse Width Modulation) method, only the PWM current driving of the electro-proportional valves will be described in the preferred embodiment of the present invention.

The operation unit 15 adjusts an on/off modulation width (duty) in accordance with the operated current value applied to the electro-proportional valves 8 and 9 and outputs the adjusted on/off modulation width through digital output ports D00 and D01 connected to a PWM driving unit (PWM IC).

The PWM driving unit is composed of high-speed switching elements and applies the power to the electro-proportional valves 8 and 9 in accordance with the output signal. The current is controlled by adjusting the modulation width so that an average current value which is generated through the continuous turning-on/off of the power that is applied to the electro-proportional valves 8 and 9 becomes equal to the current which is operated by the operation unit 15 and is supplied to the electro-proportional valves 8 and 9.

According to the PWM control method, the frequency of a carrier wave that is turned on/off is lower than an electric natural frequency of a solenoid unit of the electro-proportional valve to be driven, and thus the current flowing as described above is turned on/off. Also, a feedback circuit, which is composed of a filtering circuit so as to perform feedback of the actual current flow to solenoids of the electro-proportional valves, is installed in the control unit, and the feedback control is performed so that the operated current of the electro-proportional valves and the PWM current are equal to each other.

In this case, the PWM driving unit performs the high-speed switching of the power and the solenoid unit of the electro-proportional valves using a relatively large amount of current. Accordingly, it is preferable that a separate fuse is installed and a separate power, which is separated from the power of the control unit, is connected to a power supply unit through the fuse.

In this embodiment of the present invention, the power of the PWM driving unit is connected to the PWM driving unit through the switch 12 of the locking lever 10. When the locking lever 10 is in a manipulation locking state, the power of the PWM driving unit is intercepted, and thus the current flow to the electro-proportional valves 8 and 9 is intercepted in advance when trouble occurs in the control unit 6.

Figure 3:
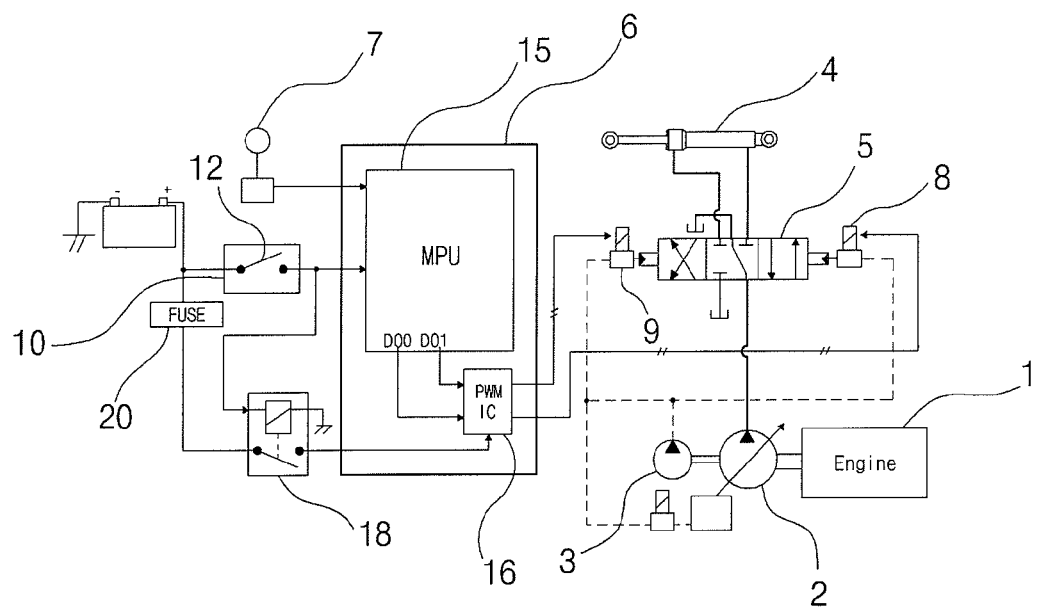
FIG. 3 is a hydraulic circuit diagram of construction equipment having an electric control lever according to a second embodiment of the present invention.

As illustrated in FIG. 3, construction equipment according to a second embodiment of the present invention, which includes an engine 1, a variable-displacement hydraulic pump (hereinafter referred to as a "hydraulic pump") 2 and a pilot pump 3 which are driven by the engine 1, and hydraulic actuator 4 such as a hydraulic cylinder which is operated by the hydraulic pump 2, also includes an electric control lever (hereinafter referred to as a "control lever") outputting a manipulation signal in proportion to a manipulation amount; a manipulation locking lever (hereinafter referred to as a "locking lever") 10 outputting a manipulation signal for control in preference to the manipulation signal of the control lever 7 when an error occurs in the manipulation signal of the control lever 7; an electronic flow control valve (hereinafter referred to as a "flow control valve") 5 installed in a flow path between the hydraulic pump 2 and the hydraulic actuator 4 and shifted, by signal pressure that is input in proportion to the manipulation signal of the control lever 7, to control a start, a stop, and a direction change of the hydraulic actuator 4; a control unit (ECU) 6 having an operation unit (MPU) 15 operating and outputting a control signal that corresponds to the manipulation signal of the control lever 7, and a current driving unit 16 controlling current so that a current value corresponding to the control signal operated by the operation unit 15 can be applied to the flow control valve 5; a power control unit intercepting current that is applied from the current driving unit 16 to the flow control valve 5 when the locking lever 10 is manipulated in a state where trouble has occurred in the control lever 7 or the control unit 6; and a relay 18 installed between the locking lever 10 and the current driving unit 16 to reduce a load of a switch 12 installed on the locking lever 10.

In the drawing, the unexplained reference numeral "20" denotes a fuse installed between a battery and the relay 18 to connect the power of the current driving unit 16 separately from the power of the control unit 6.

The above-described construction, except for the relay 18 installed between the locking lever 10 and the current driving unit 16 to reduce the load of the switch 12 installed on the locking lever 10 in consideration that the driving current of the electro-proportional valve 5 is relatively large, is substantially the same as that of the hydraulic system according to the first embodiment of the present invention as illustrated in FIG. 2, and thus the detailed explanation of the construction and operation of the construction equipment according to the second embodiment of the present invention will be omitted. Also, the same reference numerals are used for the same elements across various figures.

Figure 4:
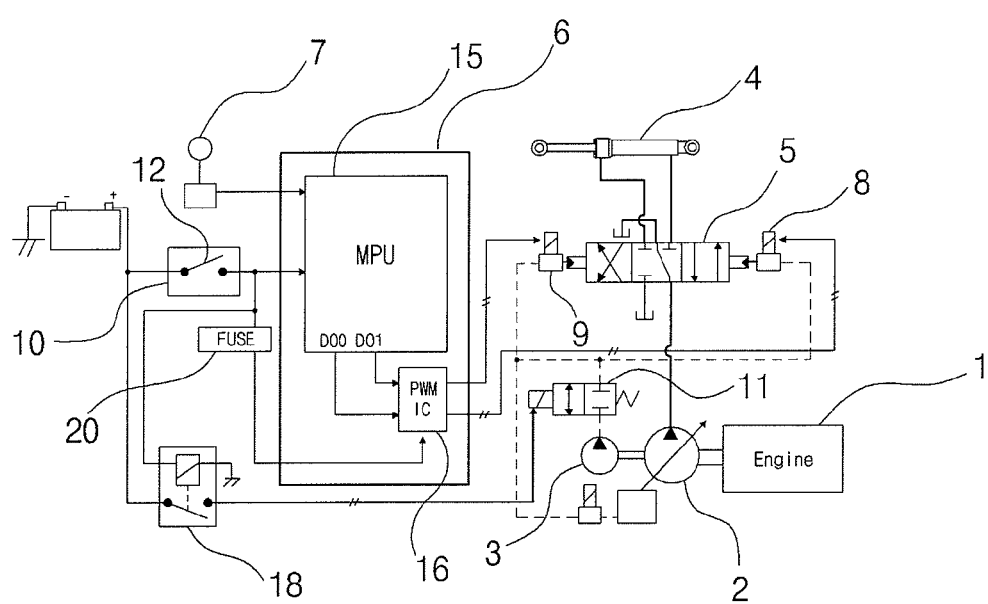
FIG. 4 is a hydraulic circuit diagram of construction equipment having an electric control lever according to a third embodiment of the present invention.

As illustrated in FIG. 4, construction equipment according to a third embodiment of the present invention, which includes an engine 1, a variable-displacement hydraulic pump (hereinafter referred to as a "hydraulic pump") 2 and a pilot pump 3 which are driven by the engine 1, and a hydraulic actuator 4 such as a hydraulic cylinder which is operated by the hydraulic pump 2, also includes an electric control lever (hereinafter referred to as a "control lever") 7 outputting a manipulation signal in proportion to a manipulation amount; a manipulation locking lever (hereinafter referred to as a "locking lever") 10 outputting a manipulation signal for control in preference to the manipulation signal of the control lever 7 when an error occurs in the manipulation signal of the control lever 7; an electronic flow control valve (hereinafter referred to as "flow control valve") 5 installed in a flow path between the hydraulic pump 2 and the hydraulic actuator 4 and shifted, by signal pressure that is input in proportion to the manipulation signal of the control lever 7, to control a start, a stop, and a direction change of the hydraulic actuator 4; a solenoid valve 11 installed in a discharge flow path of the pilot pump 2 and shifted in accordance with an electric signal input from the outside to intercept the signal pressure that is supplied to shift the electronic flow control valve 5; a control unit 6 having an operation unit 15 operating and outputting a control signal that corresponds to the manipulation signal of the control lever 7, and a current driving unit 16 connected to the flow control valve 5 to control current so that a current value corresponding to the control signal operated by the operation unit 15 can be applied to the flow control valve 5; and a power control unit intercepting current that is applied from the current driving unit 16 to the flow control valve 5 when the locking lever 10 is manipulated in a state where trouble has occurred in the control lever 7 or the control unit 6.

Figure 1:
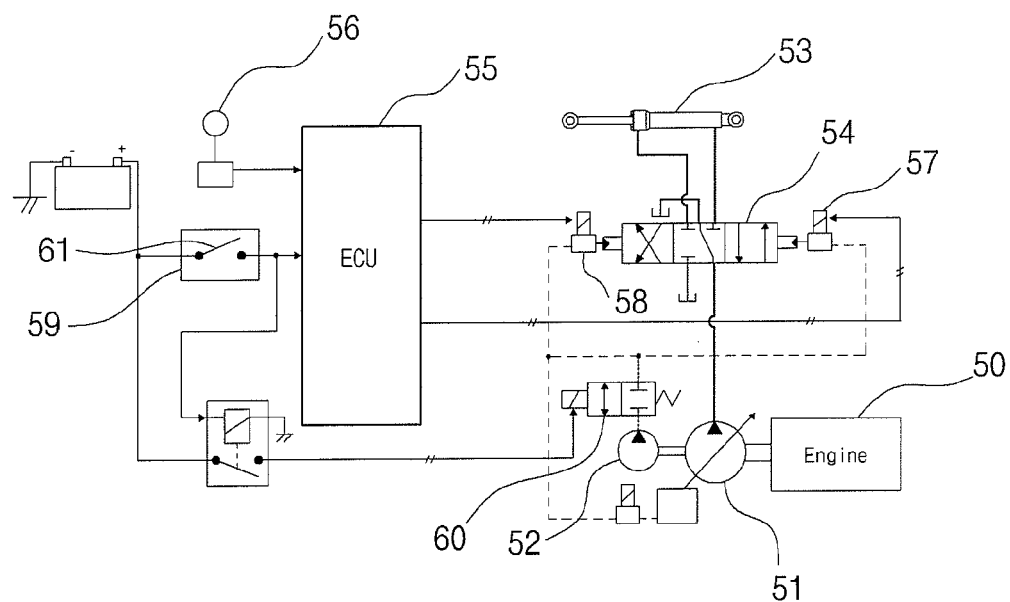
FIG. 1 is a hydraulic circuit diagram of construction equipment having an electric control lever in the related art.

The above-described construction, except for the locking lever 10, which outputs the manipulation signal to the current driving unit 16 so as to intercept the current applied to the flow control valve 5 when an error occurs in the manipulation signal of the control lever 7 and intercepts the signal pressure that is supplied from the solenoid valve 11 to the flow control valve 5 to shift the flow control valve, is substantially the same as that of the hydraulic system in the related art as illustrated in FIG. 1, and thus the detailed explanation of the construction and operation of the construction equipment according to the third embodiment of the present invention will be omitted.

The construction equipment having the electric control lever according to the third embodiment of the present invention can be used in parallel with a circuit that performs the manipulation locking by intercepting the discharge flow path of the pilot pump 52 of the hydraulic system as illustrated in FIG. 1. In this case, the relay 18 is installed to intercept a surge voltage which may be generated during the circuit connection or disconnection of the solenoid valve 11 and be applied to the control unit 6, and thus both the circuits can be electrically insulated from each other.

Figure 5:
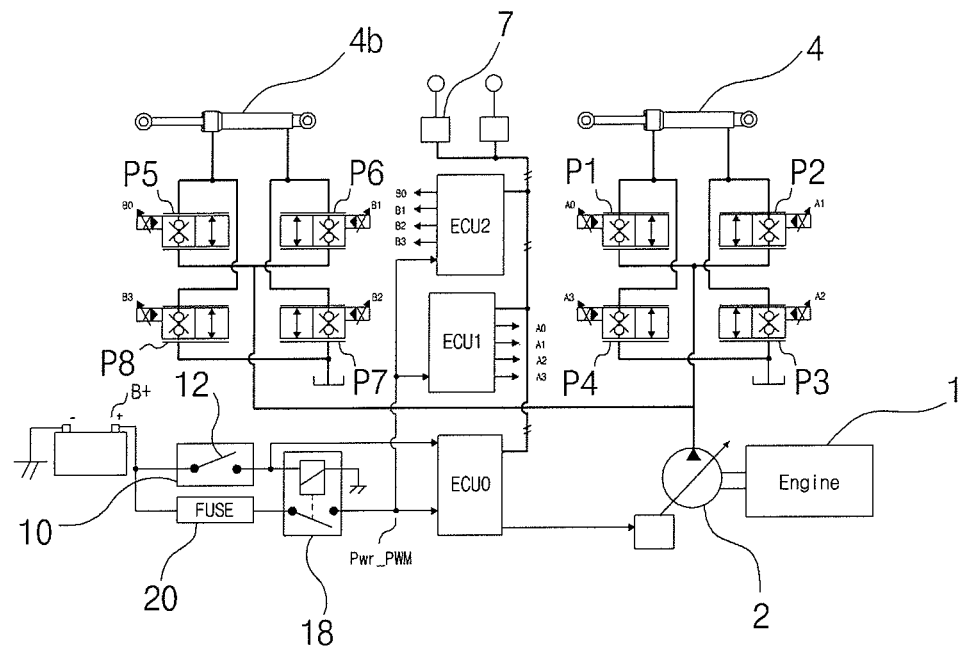
FIG. 5 is a hydraulic circuit diagram of construction equipment having an electric control lever according to a fourth embodiment of the present invention.

As illustrated in FIG. 5, construction equipment according to a fourth embodiment of the present invention, which includes an engine 1, a hydraulic pump 2 which are driven by the engine 1, and hydraulic actuators 4 and 4b which are operated by the hydraulic pump 2, also includes an electric control lever 7 outputting a manipulation signal in proportion to a manipulation amount; a manipulation locking lever 10 outputting a manipulation signal for control in preference to the manipulation signal of the electric control lever 7 when an error occurs in the manipulation signal of the electric control lever 7; electro-hydraulic proportional valves P1 to P4 and P5 to P8 installed in a flow path between the hydraulic pump 2 and the hydraulic actuators 4 and 4b and shifted, by pressure that is formed in a supply-side flow path to which hydraulic fluid from the hydraulic pump 2 is supplied in proportion to the manipulation signal of the electric control lever 7, to control a start, a stop, and a direction change of the hydraulic actuators 4 and 4b; a control unit 6 having an operation unit 15 operating and outputting a control signal that corresponds to the manipulation signal of the electric control lever 7, and a current driving unit 16 controlling current so that a current value corresponding to the control signal operated by the operation unit 15 can be applied to the electro-hydraulic proportional valves P1 to P4 and P5 to P8; and a power control unit intercepting current that is applied from the current driving unit 16 to the electro-hydraulic proportional valves P1 to P4 and P5 to P8 when the manipulation locking lever 10 is manipulated in a state where trouble has occurred in the electric control lever 7 or the control unit 6.

In the construction equipment having the electric control lever according to the fourth embodiment of the present invention as illustrated in FIG. 5, the self pilot operated electro-hydraulic proportional valve is designed so that the pressure formed in a supply-side flow path of the electro-hydraulic proportional valves P1 to P4 and P5 to P8 acts as a force that shifts main spools of the electro-hydraulic proportional valves P1 to P4 and P5 to P8, and the opening of the electro-hydraulic proportional valves P1 to P4 and P5 to P8 is determined by the electric signal.

In the hydraulic system as illustrated in FIG. 5, a plurality of controllers drives the electro-hydraulic proportional valves P1 to P4 and P5 to P8 connected to the hydraulic actuators 4 and 4b, respectively. That is, when the control lever 7 is manipulated, the corresponding manipulation signal is input to the respective controllers through communications (wired or wireless communications).

ECU0 receives the manipulation signal from the control lever 7, calculates the flow rate of the hydraulic pump 2 that corresponds to the manipulation signal, and controls the inclination angle of the swash plate of the hydraulic pump 2 through a regulator.

ECU1 receives the manipulation signal from the control lever 7, and controls the electro-hydraulic proportional valves P1 to P4 connected to the right hydraulic actuator 4, as shown in FIG. 5, with a control signal that corresponds to the manipulation signal.

ECU2 receives the manipulation signal from the control lever 7, and controls the electro-hydraulic proportional valves P5 to P8 connected to the left hydraulic actuator 4, as shown in FIG. 5, with a control signal that corresponds to the manipulation signal.

When a piston of the right hydraulic actuator 4 as illustrated in FIG. 5 is contracted, ECU1 drives current A0, and the hydraulic fluid of the hydraulic pump 2 is supplied to a small chamber of the hydraulic actuator 4, while ECU1 also drives current A3, and the hydraulic fluid on the large chamber side of the hydraulic actuator 4 returns to a hydraulic tank.

Even in the case of manipulating the control lever 7 in a state where the manipulation signal of the locking lever 10 is in an off state that corresponds to the locking position, the operation unit 15 controls the electro-hydraulic proportional valves not to be operated by outputting the minimum or zero current that will drive the electro-hydraulic proportional valves.

On the other hand, if the control lever 7 is manipulated in a state where the manipulation signal of the locking lever is in an on state that corresponds to the unlocking position, the operation unit 15 operates and outputs the driving current so that the electro-hydraulic proportional valves can be driven.

In this case, by making the power of the current driving units of the respective controllers be controlled by the locking lever 10, unwanted current that flows to the current driving unit when trouble occurs in the respective controllers can be intercepted.

As described above, in accordance with the manipulation signal of the locking lever 10, the operation unit 15 operates the current that drives the electro-hydraulic proportional valves according to the manipulation signal of the control lever 7. Accordingly, if an error occurs in the manipulation signal of the manipulation lever 7, unwanted driving of the electro-hydraulic proportional valves can be intercepted by the manipulation signal of the locking lever 10.

Also, if the manipulation signal of the locking lever 10 is not normally transferred to the operation unit 15, the power of the current driving unit 16 is simultaneously controlled, and thus unwanted current that is output to the electro-hydraulic proportional valve when trouble occurs in the control lever can be intercepted.

As illustrated in FIG. 5, since a plurality of current driving units is provided in a plurality of controllers, the relay 18 is installed in consideration of the load occurrence. Accordingly, the relay 18 is driven to intercept the power in accordance with the manipulation signal of the locking lever 10. Although not illustrated in the drawing, if the capacity of the switch installed on the locking lever is sufficient, a power interruption circuit having a switch with a relay omitted can be used.

Figure 6:
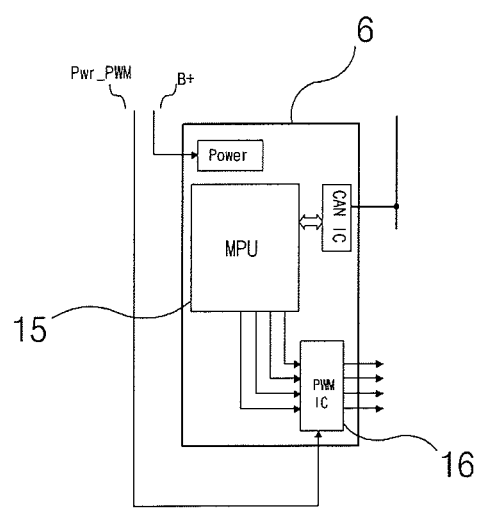
FIG. 6 is a diagram illustrating the detailed configuration of a control unit in construction equipment having an electric control lever according to the first to third embodiments of the present invention.

FIG. 6 illustrates the configuration in which the power that is controlled by the locking lever as shown in FIGS. 2, 3, and 4 is connected to respective control units. That is, the main power of the control unit and the power of the current driving unit 16 are separately used.

Figure 7:
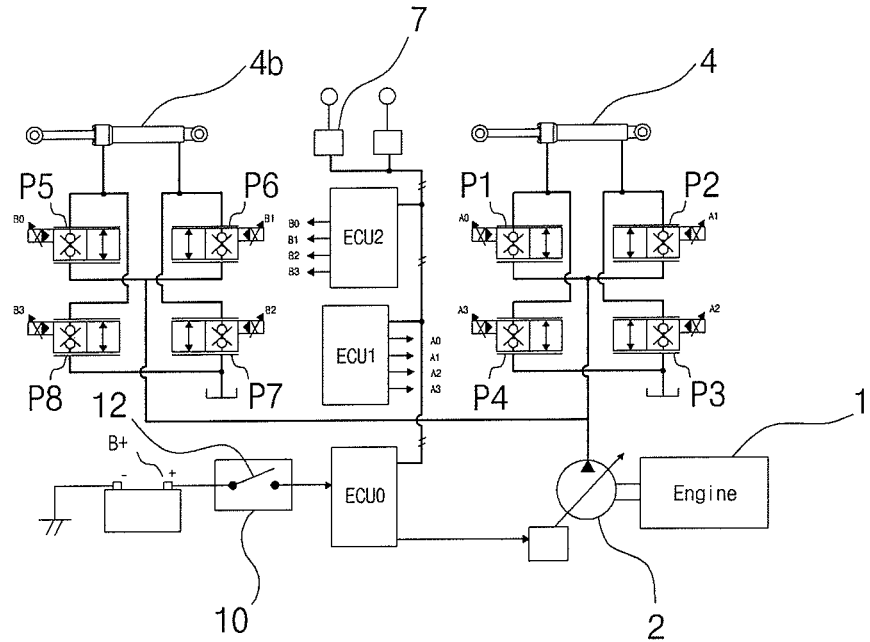
FIG. 7 is a hydraulic circuit diagram of construction equipment having an electric control lever according to a fifth embodiment of the present invention.

In the construction equipment having the electric control lever according to a fifth embodiment of the present invention as illustrated in FIG. 7, in performing the power control of the current driving unit of each control unit in accordance with the manipulation signal of the locking lever, the signal of the switch 12 that is installed on the locking lever 10 is transferred to the respective control units through communications, and thus the respective control units can control the power of the current driving unit 16 in accordance with the signal.

Figure 8:
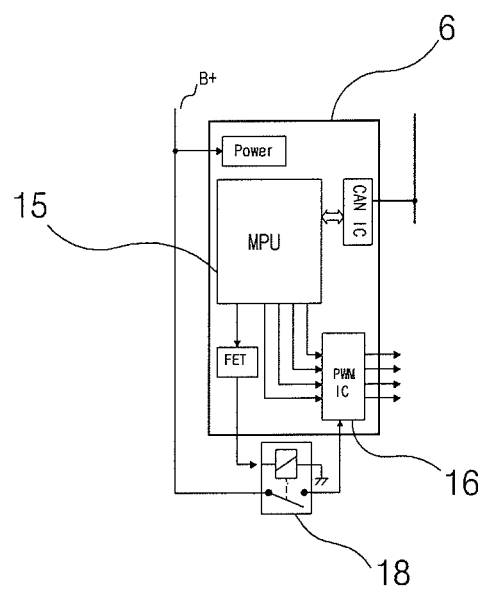
FIG. 8 is a diagram illustrating the detailed configuration of a control unit in construction equipment having an electric control lever according to the fourth and fifth embodiments of the present invention.

The manipulation signal of the locking lever 10, which is input to ECU0, is transferred to ECU1 and ECU2 through communication lines, and the operation unit 15 of each ECU outputs a control signal for driving the relay 18 as illustrated in FIG. 8 in accordance with the signal. The output signal is amplified by a current amplifying device to drive the relay 18. As the relay 18 is driven, the power of the current driving unit 16 of the controller is controlled.

Although it is exemplified that the manipulation signal of the locking lever 10 is transferred through wired communications, the manipulation signal may also be transferred through wireless communications. Also, a manipulation signal generation device that corresponds to the locking lever 10 may be installed in a cab of the equipment, or a separate movable wired/wireless device may be adopted in the same manner without changing the hydraulic system.

As described above, according to the construction equipment that controls the hydraulic fluid supplied to the hydraulic actuator according to the manipulation of the electric control lever according to the embodiments of the present invention, the control signal applied to the flow control valve is intercepted when trouble occurs in the control unit, and thus the working device such as a boom or the like can be prevented from malfunctioning.

Although preferred embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. Construction equipment including an engine, a hydraulic pump and a pilot pump which are driven by the engine, and a hydraulic actuator which is operated by the hydraulic pump, the construction equipment comprising:

an electric control lever outputting a manipulation signal in proportion to a manipulation amount;

a manipulation locking lever outputting a manipulation signal for control in preference to the manipulation signal of the electric control lever when an error occurs in the manipulation signal of the electric control lever;

an electronic flow control valve installed in a flow path between the hydraulic pump and the hydraulic actuator and shifted, by signal pressure that is input in proportion to the manipulation signal of the electric control lever, to control a start, a stop, and a direction change of the hydraulic actuator;

a control unit having an operation unit operating and outputting a control signal that corresponds to the manipulation signal of the electric control lever, and a current driving unit controlling current so that a current value corresponding to the control signal operated by the operation unit can be applied to the electronic flow control valve; and a power control unit intercepting current that is applied from the current driving unit to the electronic flow control valve when the manipulation locking lever is manipulated in a state where trouble has occurred in the electric control lever or the control unit.

2. The construction equipment of claim 1, wherein the power control unit includes a switch installed on the electric control lever, and when the electric control lever is manipulated, the switch is switched on to supply the power to the current driving unit.

3. The construction equipment of claim 2, wherein the power control unit includes a relay that is driven to supply the power to the current driving unit when the switch is switched on.

4. Construction equipment including an engine, a hydraulic pump and a pilot pump which are driven by the engine, and a hydraulic actuator which is operated by the hydraulic pump, the construction equipment comprising:

an electric control lever outputting a manipulation signal in proportion to a manipulation amount;

a manipulation locking lever outputting a manipulation signal for control in preference to the manipulation signal of the electric control lever when an error occurs in the manipulation signal of the electric control lever;

an electronic flow control valve installed in a flow path between the hydraulic pump and the hydraulic actuator and shifted, by signal pressure that is input in proportion to the manipulation signal of the electric control lever, to control a start, a stop, and a direction change of the hydraulic actuator;

a solenoid valve installed in a discharge flow path of the pilot pump and shifted in accordance with an electric signal input from the outside to intercept the signal pressure that is supplied to shift the electronic flow control valve;

a control unit having an operation unit operating and outputting a control signal that corresponds to the manipulation signal of the electric control lever, and a current driving unit controlling current so that a current value corresponding to the control signal operated by the operation unit can be applied to the electronic flow control valve; and a power control unit intercepting current that is applied from the current driving unit to the electronic flow control valve when the manipulation locking lever is manipulated in a state where trouble has occurred in the electric control lever or the control unit.

5. The construction equipment of claim 4, wherein the power control unit includes a switch installed on the electric control lever, and when the electric control lever is manipulated, the switch is switched on to supply the power to the current driving unit.

6. The construction equipment of claim 5, wherein the power control unit includes a relay that is driven to supply the power to the current driving unit when the switch is switched on.

7. Construction equipment including an engine, a hydraulic pump which are driven by the engine, and hydraulic actuators which are operated by the hydraulic pump, the construction equipment comprising:

an electric control lever outputting a manipulation signal in proportion to a manipulation amount;

a manipulation locking lever outputting a manipulation signal for control in preference to the manipulation signal of the electric control lever when an error occurs in the manipulation signal of the electric control lever;

electro-hydraulic proportional valves installed in a flow path between the hydraulic pump and the hydraulic actuators and shifted, by pressure that is formed in a supply-side flow path to which hydraulic fluid from the hydraulic pump is supplied in proportion to the manipulation signal of the electric control lever, to control a start, a stop, and a direction change of the hydraulic actuators;

a control unit having an operation unit operating and outputting a control signal that corresponds to the manipulation signal of the electric control lever, and a current driving unit controlling current so that a current value corresponding to the control signal operated by the operation unit can be applied to the electro-hydraulic proportional valves; and a power control unit intercepting current that is applied from the current driving unit to the electro-hydraulic proportional valves when the manipulation locking lever is manipulated in a state where trouble has occurred in the electric control lever or the control unit.

8. The construction equipment of claim 7, wherein the power control unit includes a relay which is connected to the current driving unit and is driven by the operation unit in accordance with an output signal of the manipulation locking lever to supply the power to the current driving unit.

9. The construction equipment of claim 8, wherein the operation unit and the manipulation locking lever are connected in a wired or wireless communication method to transfer the manipulation signal of the manipulation locking lever.

* * * * *